June 8, 1943.　　　　F. H. MUELLER　　　　2,321,233
VALVE STRUCTURE
Original Filed July 29, 1940　　2 Sheets-Sheet 1

Inventor:
Frank H. Mueller,
By Cushman, Darby & Cushman
Attorneys.

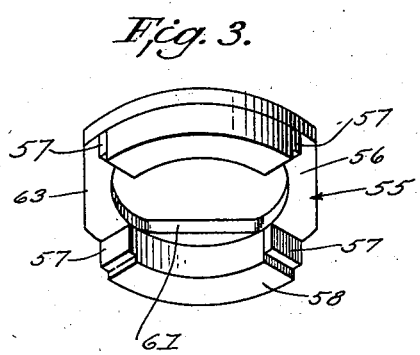
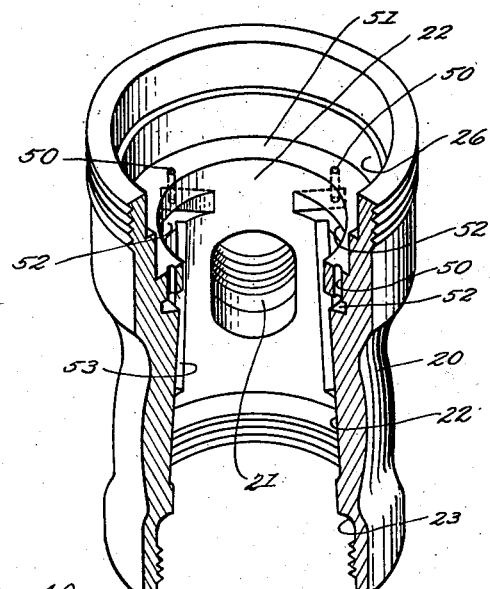
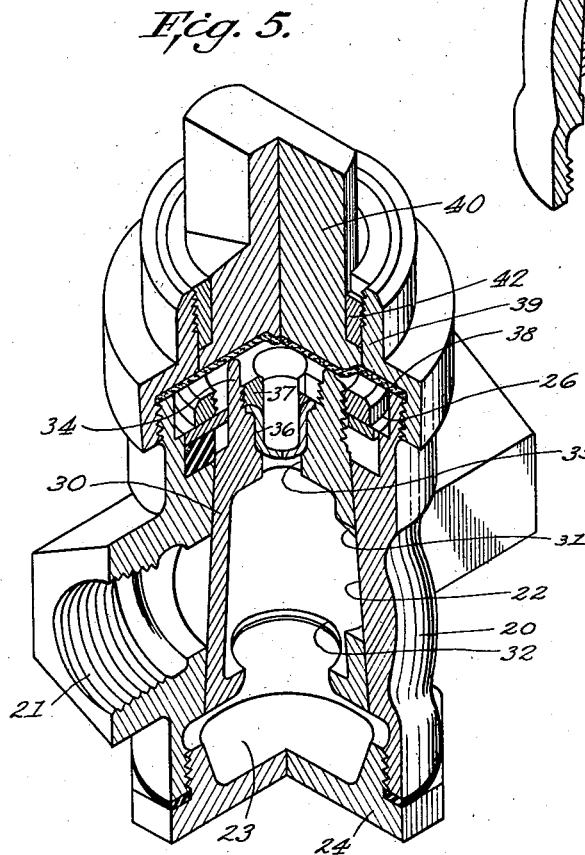

Patented June 8, 1943

2,321,233

UNITED STATES PATENT OFFICE 2,321,233

VALVE STRUCTURE

Frank H. Mueller, Decatur, Ill., assignor to Mueller Co., Decatur, Ill., a corporation of Illinois Original application July 29, 1940, Serial No. 348,249, now Patent No. 2,289,721, dated July 14, 1942. Divided and this application March 15, 1941, Serial No. 383,626

6 Claims. (Cl. 251—93)

The present invention relates to valve structures, and, more particularly, to ground key stops, the application being a division of my original application for Valve structures, Serial No. 348,249, filed July 29, 1940, now Patent 2,289,721, granted July 14, 1942.

An object of the invention is to provide a valve structure of such design that the valve element will be urged to proper seated position by the line pressure.

Another object of the invention is to provide a lubricated valve including improved forms of lubricating passages and which is fully sealed against escape of pressure.

Other objects and advantages of the invention will be apparent from the following drawings, wherein:

Figure 3 is a perspective view of a lubricant pressure cut-off device which may be used in the valve;

Figure 4 is a perspective view, with a portion cut away, of the valve body;

Figure 5 is a perspective view of the assembled valve element and valve body, with portions cut away;

Figure 1:
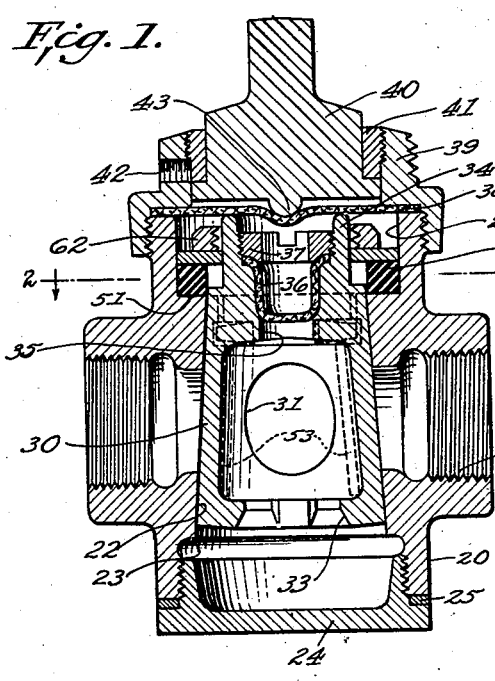
Figure 1 is a vertical sectional view through a valve structure.

Referring to Figures 1 to 5, the numeral 20 designates a valve body or casing element provided with a flow passageway 21 and a transversely arranged tapered seat 22. Seat 22 opens at its larger end to a chamber 23 closed by a threaded cap 24, with an interposed gasket 25. The smaller end of the tapered seat opens to a chamber or recess 26.

A valve element or plug 30 is positioned in the tapered seat 22, the valve element including a transverse or radial flow port 31 which opens at the larger end of the plug through an opening 33 to the chamber 23 at that end of the valve body. At its smaller end plug 30 is provided with a shank 34 which is axially bored as indicated at 35, this port being closed by an impulse member comprising a cup-shaped rubber diaphragm 36 having its edges clamped by a threaded collar 37 which engages internal threads in the outer and countersunk end of bore 35.

The chamber 26 at the smaller end of the valve body is closed by a rubber diaphragm 38 clamped between the upper edge of the valve body element 20 and a ring 39 threaded upon that element. The operating handle 40 is positioned within the ring 39, being held against outward movement by a collar 41 threaded in ring 39 and which bears upon a lateral flange on the handle 40. Ring 41 may be locked in place by means of a set screw 42, as shown in Figure 1.

The flat inner surface of handle 40 is provided with a diametrical rib 43 which is semi-cylindrical in shape. Rib 43 bears against the upper surface of the sealing diaphragm 38 while the outer end of the plug shank 34 bears against the undersurface of the diaphragm. The outer end of shank 34 is provided with a pair of diametrically opposed recesses or notches 44 of sufficient depth axially of the plug to accommodate the thickness of diaphragm 38 and also a sufficient depth of rib 43 to cause the plug to be turned when the handle 40 is turned.

Thus, when the handle 40 is rotated, and as described in my above-mentioned original application, the side surfaces at the ends of the rib 43 will ride up along the less steeply inclined notch 44, with the result that the plug will be urged axially of the valve body 20 to be unseated to a limited extent and then the plug will be given a turning movement, being held slightly unseated until turning is completed.

The line pressure within the port 31 of the plug will also act upwardly against the cup-shaped diaphragm 35 to act upon a body of grease contained within that diaphragm and chamber 26 at the smaller end of the tapered seat. Grease in this chamber will be forced through passages or ports 50 which, as best shown in Figure 4, extend from the inner shoulder 51 of chamber 26 to pockets 52 positioned in the seat 22 of the valve body element at a point spaced axially from shoulder 51. Four such passages 50 and pockets 52 are provided substantially equi-distantly spaced about the seat 22 forming one face of the seating surface of the valve structure, and the walls of the pockets 52 opposite to the inner ends of the passages 50 open to grooves 53 extending longitudinally of the seating surface 22 but terminating at a point spaced from the larger end of the plug 30.

Figure 2:
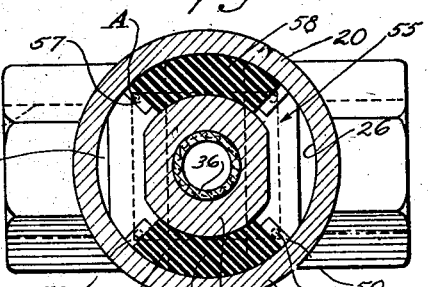
Figure 2 is a transverse sectional view on the line 2—2 of Figure 1.

Flow of grease through the passages 50 from chamber 26 is controlled by a cut-off washer 55 of the construction best shown in Figure 3 disclosed in the application of Frank H. Mueller and Walter J. Bowan for Lubricated valve, Serial No. 312,788, filed January 6, 1940 and comprising a metal plate 56 of substantially annular form provided with integral depending lugs 57. The lugs 57 are arranged in pairs and are adapted to retain an arcuate strip 58 of resilient material, such as rubber, which is of greater axial depth than the depth of the lugs so that the outward surface of the strips 58 will project past the ends of the lugs. The cut-off washer 56 is adapted to surround the shank 34 of plug 30 which is flattened at diametrically opposite points, as shown in Figure 2, to interfit with flattened surfaces 61 on the washer aperture (Figure 3) so that the washer will rotate with the plug. The washer is held in place on the shank 37 by means of a collar 62 threaded on the outer surface of the shank. As shown in Figure 2, washer 56 is flattened on two sides, as indicated at 63, in order to permit grease to move from the upper portion of chamber 26 past the washer to reach the valve body passages 50.

As is illustrated in Figure 2, when the plug 30 is in closed position, the passages 50 will be open to the grease chamber 26 because the rubber strips 58 will not overlie these passages. The lugs 57 on washer 55 will be above the mouths of the passages 50, but these lugs will not be in contact with the shoulder 51 because they are of less depth than the rubber strips 58. Hence the pressure of the fluid entrapped within the valve plug will be acting upon the cup-shaped diaphragm 35 to maintain a sealing pressure of grease in the longitudinal grooves 53.

When the plug 30 is rotated in a counter-clockwise direction as viewed in Figure 2 for the purpose of bringing its flow passage 31 into alignment with the flow passage 21 of the valve element 20, the advancing edges of the resilient strips 58 will immediately close the mouths of the passages 50 designated A in Figure 2, these being the passages which directly communicate with the longitudinal grooves 53 past which the plug port 31 will move during such turning movement of the plug. As a result, the pressure of grease in the chamber 26 will not act upon these two grooves 53 at the time that the plug is being rotated. When the plug reaches closed position after a movement of 90°, all of the passages 50 will be open to chamber 26.

As has been heretofore described, the initial action of turning the operating handle 40 to rotate plug 30 will cause the advancing edges of rib 43 to act through the rubber diaphragm 38 to move the plug axially toward the larger end of the seat 22. However, before the rib 43 can climb up upon the edge of shank 37, the plug will rotate. This construction permits the plug to be initially moved axially in its seat upon any turning movement. The sealing diaphragm 38 prevents leakage of fluid from the valve and simultaneously enables turning pressure to be transmitted from the handle 40 to the plug 30 with the use of an operating handle separate from the plug. The use of a diaphragm for a seal at this point obviously provides a more efficient seal than a washer. Because of the rounded form of rib 43 and the tapered form of the notches 43 in the plug shank 34, the diaphragm 38 will not become worn, even after repeated turning of the plug.

The arrangement whereby pressure is transmitted from the line through the diaphragm 35 to the grease chamber 26 is particularly economical in manufacture, in that it requires no special machining of the plug or valve body.

Figure 7:
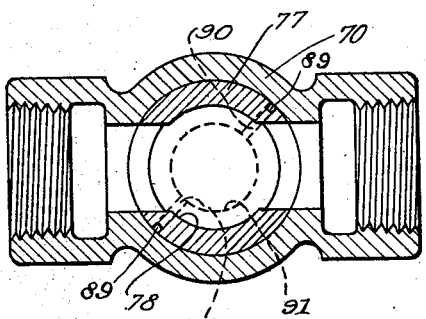
Figure 7 is a transverse sectional view on the line 7—7 of Figure 6.
Figure 6:
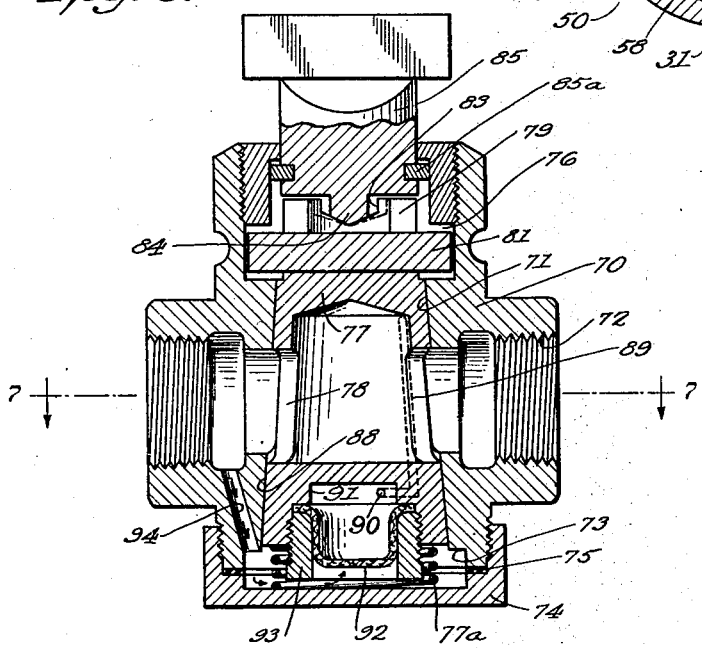
Figure 6 is a central vertical section of a modified form of valve structure.

Referring to Figures 6 and 7, these illustrate a valve body element 70 provided with a tapered seat 71 and a flow passageway 72, the larger end of the tapered seat 71 opening to a chamber 73 closed by a cap 74 with an interposed washer 75. The smaller end of the seat 71 opens to a chamber 76.

The valve element or plug 77 is provided with a transverse or radial flow port 78. The shank 79 at the smaller end of plug 77 is notched at diametrically opposite points, as described in my above-mentioned original application, to receive a transverse pin 81 moving in the chamber 76 and adapted to abut against stop shoulders 82 formed in that chamber after 90° movement of the plug. The shank 79 contains another pair of diametrically opposite notches 83 which are relatively shallow and are provided with inner walls of shallow V-shaped and concave form to receive a rib 84 on the underside of an operating handle 85. A seal is provided about handle 85 by washer 85a.

Hence when handle 85 is turned, it may move circumferentially a slight distance before contacting with the side walls of the notch 83, and during such initial movement its inner beveled end will act upon the correspondingly tapered inner edge of notch 83 to move the plug 77 axially of the seat 71. This arrangement, like the corresponding arrangement of Figure 1, enables the plug to be moved from a seized position. A spring 77a at the larger end of the plug will return the latter to normal position when turning is completed.

The seating surface 88 of the valve element or plug 77, which surface forms one face of the seating surface of the valve structure, is provided with a pair of oppositely disposed longitudinally extending passageways 89 which are of shorter length than the seating surface 71 of the valve body element and plug but of sufficient length to extend past the flow port 72. The grooves 89 communicate adjacent the larger end of the plug with radial passages 90 which open to a central recess 91 in the plug. Recess 91 contains an outwardly facing cup-shaped diaphragm or impulse member 92 secured in place by a threaded ring 93 so that the outer surface of diaphragm 92 is open to the chamber 73 at the larger end of the valve body seat. Chamber 73, in turn, communicates with the pressure side of the flow passageway 72 through a port 94 so that the line pressure may act upon the outer surface of diaphragm 92 to force grease in chamber 91 to the longitudinal grooves 89.

The passages 89 in the seating surface 88 of the plug 77 are so arranged with respect to the turning movement permitted the plug by the stop shoulders 82 that they will never be opened to the line pressure during turning movement of the plug.

It will be observed from the above that in both forms of the present invention the line pressure maintains a grease seal in the seating surface and that both forms of the invention entirely seal the valve against leakage at the ends of the plug. At the same time, arrangements are provided whereby the plug will be moved axially of its seat during the initial portion of any turning movement of the plug, this unseating action being maintained throughout the turning movement, the plug then being returned to normal seating position when the turning movement is completed, either by line pressure, or a spring. In Figure 1, line pressure may exert seating pressure on the upper surface of flow port 31 and also, through opening 33, upon the larger end of the plug. In Figure 6, line pressure may exert seating pressure on the upper surface of the flow port and also upon the portion of the larger end of the plug which surrounds diaphragm 92. It will be observed that the downwardly facing surfaces just mentioned which are present in each form are greater in area than such portion of the lower surface of the flow port as will have un-seating pressure exerted thereon.

As is illustrated in Figures 1, 5 and 6, the diaphragms are of concavo-convex form in their normal or rest position, with the convex portions extending into the pressure chamber which is open to the flow line pressure. At the same time, the convex portion is spaced from any opposed wall of the pressure chamber. By this arrangement, the diaphragm will always be subject to pressure from the flow line over a diaphragm area at least as great as the area defined between the secured edges of the diaphragm. For example, in Figure 1, the diaphragm 36 will always be subject to pressure through the aperture 35 over an area of the diaphragm at least as great as the area defined by the aperture in the securing ring 37. The fact that the diaphragm is of concavo-convex form with its convex portion normally extending into the pressure chamber, i. e., away from the lubricant chamber, also insures that the lubricant will be subject to flow line pressure throughout maximum change of position of the diaphragm.

The terminology used in the specification is for the purpose of description and not of limitation, the scope of the invention being set forth in the claims.

I claim:

1. A valve structure including a casing element provided with a flow passageway adapted to communicate with a flow line and having a transversely arranged tapered seat, a tapered plug rotatable in the seat and provided with a flow port, a recess in the larger end of the plug to form a lubricant chamber, lubricating passages in the seating surface of the valve structure adapted to communicate with the lubricant chamber, an impulse member in the recess to define the outer wall of the lubricant chamber, a second chamber in the casing element enclosing said larger end of the plug, said impulse member facing into said second chamber, and a passage in the casing element to place said second chamber in communication with the flow passageway so that flow passageway pressure may act upon the larger end of the valve to force it to seated position and will act upon the impulse member to thereby exert pressure on the lubricant in the lubricant chamber.

2. A valve structure according to claim 1, wherein the impulse member is a flexible diaphragm.

3. A valve structure including a casing element provided with a flow passageway adapted to communicate with a flow line and having a transversely arranged tapered seat, a tapered plug rotatable in the seat and provided with a flow port, a recess in one end of the plug to form a lubricant chamber, lubricating passages in the seating surface of the valve structure adapted to communicate with the lubricant chamber, an impulse member in the recess to define a wall of the lubricant chamber, said plug including a surface extending transversely of the plug axis, and facing toward the larger end of the plug, and means to place said surface and the impulse member in communication with the flow line so that line pressure may act upon the impulse member to force lubricant from the lubricant chamber into the lubricating passages and may act upon said surface of the plug to move the latter toward the smaller end of the casing element seat.

4. A valve structure according to claim 3, wherein the impulse member is a flexible diaphragm.

5. A valve structure including a casing element provided with a flow passageway adapted to communicate with a flow line and having a transversely arranged tapered seat, a tapered plug rotatable in the seat and provided with a flow port, an aperture extending axially of the plug from the flow port to the smaller end of the plug, a lubricant chamber in the casing element at the smaller end of the plug, lubricating passages in the seating surface of the valve structure adapted to communicate with the lubricant chamber, an impulse member in the aperture to define a wall of the lubricant chamber and adapted to be acted upon by line pressure in the plug flow port to force lubricant into the lubricating passage, said plug including a surface extending transversely of its axis and facing toward the larger end of the plug and which will be subject to line pressure to force the plug to seated position.

6. A valve structure according to claim 5, wherein the impulse member is a flexible diaphragm.

FRANK H. MUELLER.